Patented Apr. 29, 1930

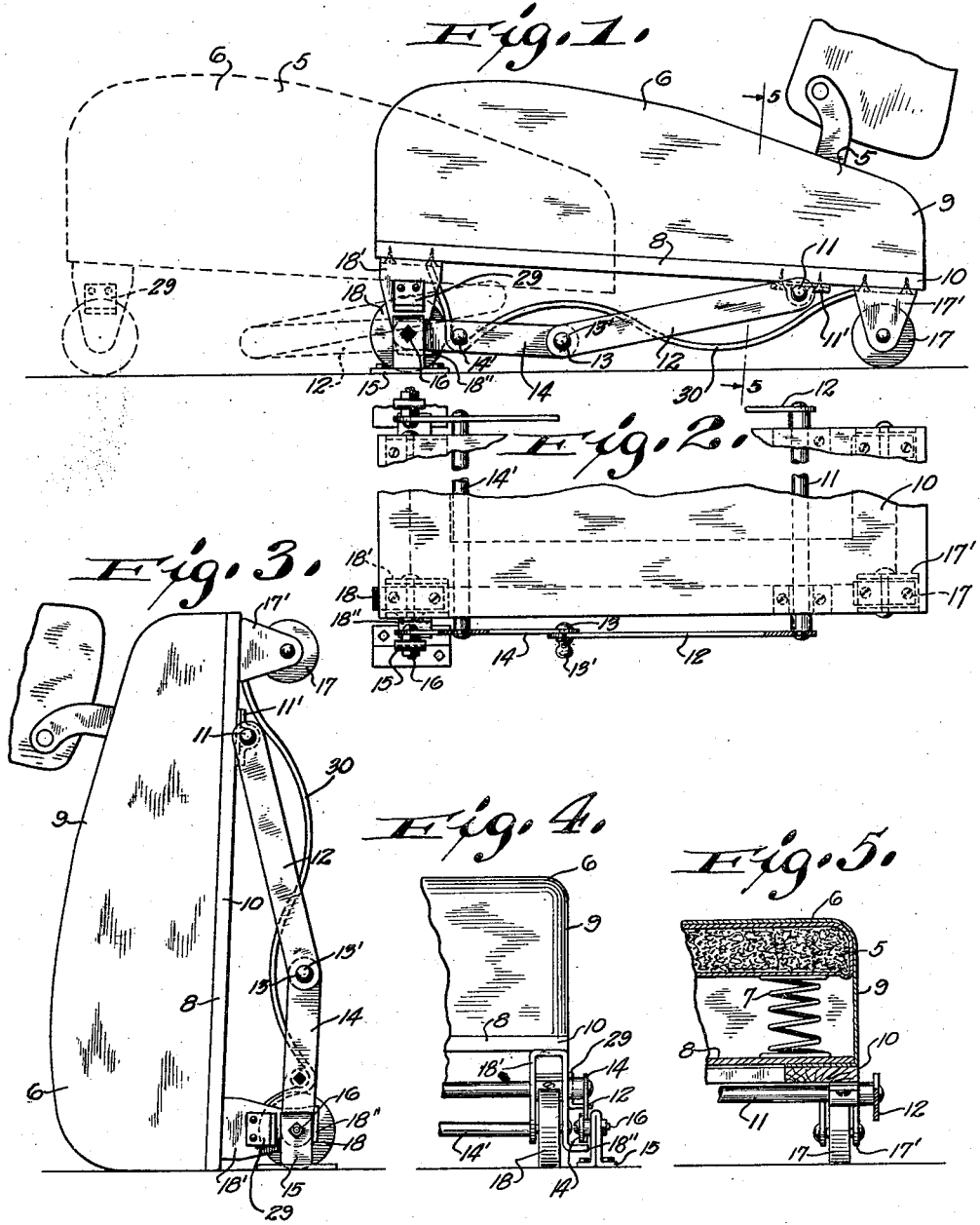

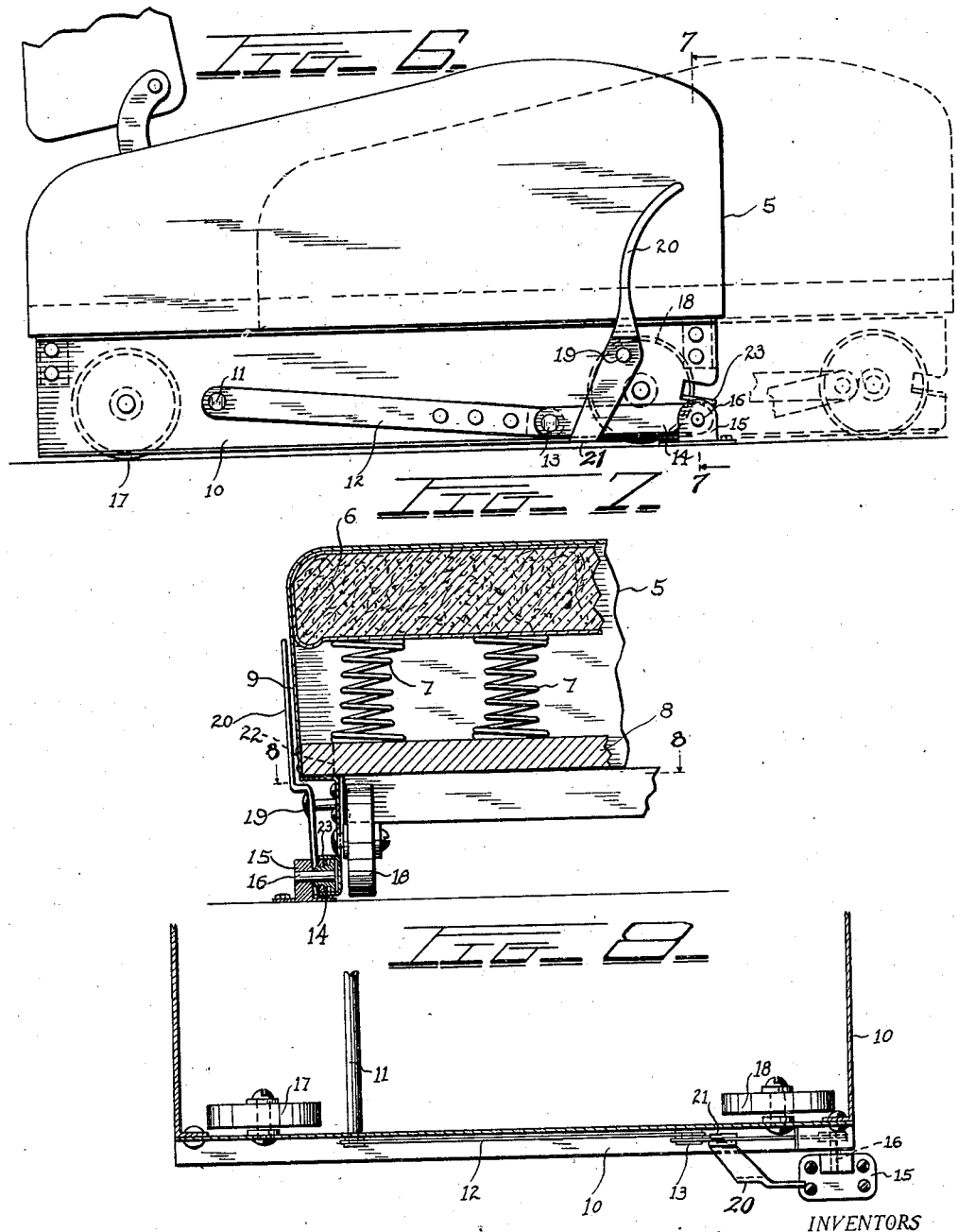

1,756,230

UNITED STATES PATENT OFFICE

HERMAN L. VAN VALKENBURG AND SWIFT MILLER, OF WAUWATOSA, WISCONSIN, ASSIGNORS TO THE PARALOCK COMPANY, OF MILWAUKEE, WISCONSIN, A CORPORATION OF WISCONSIN

AUTOMOBILE SEAT

Application filed July 19, 1926. Serial No. 123,559.

This invention relates to improvements in automobile seats, and more particularly to a slidable and tiltable seat.

In recent years the "coach" type of automobile has gained great favor in the automobile industry, but access to the rear seat of a "coach" is only afforded by the front doors and a front seat must be tilted to allow the passage of a person. Obviously the occupant of the front seat must leave the same and step out of the vehicle while the seat is tilted.

It is one of the objects of the present invention to overcome the aforementioned objection by providing an automobile seat which may be moved forwardly while the occupant remains in sitting position.

A further object of the invention is to provide an automobile seat of the class described which is easily operated and which can be manually locked in normal position.

A further object of the invention is to provide a sliding automobile seat which will require no modification of the normal construction of the vehicle floor boards and which will not hinder access thereto and removal of the same.

A further object of the invention is to provide an automobile seat which is both slidable and tiltable.

A further object of the invention is to provide an automobile seat of the character described which is attached to the floor at two points only.

A further object of the invention is to provide a slidable automobile seat having means to prevent the seat from raising upwardly when moved forwardly.

A further object of the invention is to provide a sliding seat having a link mechanism to give the seat a parallel movement, said link mechanism also having a toggle effect which will lock the seat laterally when fully extended.

A further object of the invention is to provide an automobile seat of the type mentioned which is of very simple construction, is strong and durable, and is well adapted for any form of automobile.

With the above and other objects in view, the invention consists of the improved automobile seat, and its parts and combinations, as set forth in the claims, and all equivalents thereof.

In the accompanying drawing in which the same reference characters indicate the same parts in all of the views:

Fig. 1 is a side view of the improved automobile seat, the view also showing by dotted lines another position of the seat;

Fig. 2 is a fragmentary top view thereof;

Fig. 3 is a side view of the seat shown in a tilted-up position;

Fig. 4 is a fragmentary detail end view;

Fig. 5 is a transverse sectional detail view taken on line 5—5 of Fig. 1;

Fig. 6 is a side view of a modified form of the improved automobile seat;

Fig. 7 is a fragmentary sectional view thereof taken on line 2—2 of Fig. 6; and

Fig. 8 is a sectional view taken on line 8—8 of Fig. 7.

Referring now more particularly to the drawings, it will appear that the numeral 5 indicates the improved automobile seat, the body portion of which is of usual construction with a stuffed top 6, mounted on springs 7, which are confined between said top 6 and a base 8, the entire body portion being finished by a suitable cloth covering layer 9.

The lower edge of the body portion of the seat is fitted with a four-sided frame 10, and extending beneath the frame is a rod 11 which is journaled in the bearings 11' and has rigidly secured thereto at each end a link 12. The forward ends of the links 12 are pivotally secured, as at 13, to the inner ends of short links 14.

The short links 14 are rigidly secured together by a rod 14'.

Bearing members 15 are secured to the floor of the vehicle adjacent the forward corner portions of the seat and said bearings have journaled therein short inwardly extending shafts or bolts 16. The inner ends of the shafts are enlarged and the ends of the links 14 are mounted thereon between washers, as shown in Fig. 2.

Rear wheels 17 and front wheels 18 are journaled in brackets 17' and 18' projecting downwardly from the front and rear portions of the side members 10, and said wheels are arranged for rolling engagement with the floor of the vehicle.

Forming part of the pivot pins 13 are outwardly projecting handles 13', so that when one of the handles is pulled upwardly, the seat will be moved forward, and the links 12 and 14 will fold forwardly with respect to each other and allow the seat to assume its forward position.

It is to be noted that the lower portions of the brackets 18' are flanged outwardly to form shoulders 18" which are in the path of travel of the links 14. Said shoulders engage the lower edges of the links 14 and hold the parts in the position shown in Fig. 1, and prevent the forward end of the seat from tipping up when the occupant leans back in the seat. They also hold the said links 14 from swinging outwardly when the seat is swung upwardly, as indicated in Fig. 3.

Attached to the outer faces of the brackets 18' are angle pieces 29 having their flanged portions extending horizontally. The said flanges, cooperating with the flanges 18", engage the edges of the links 14 and maintain the correct position of the shaft 16 with relation to the wheels 18 and permit the entire seat to rotate on the shaft 16 when it is desired to tilt the seat into the position shown in Fig. 3. A bent rod 30 is attached to the under side of the seat frame and is curved to correspond with the line of travel of the rod 14' when the seat is moved. A medial portion of the rod 30 engages the rod 14' and prevents undesired tilting movement of the seat.

Now, referring to the modified form shown in Figs. 6, 7 and 8, it will be noted that the parts are substantially the same, with the exception that in lieu of the handles 13' for swinging the links 12 and 14 upwardly, a lever 20 mounted on a pivot pin 19 projecting outwardly from the seat 5, is provided, and this lever is formed with a lower angled part 21 which extends beneath the lower edge of the link 14. To move the seat it is only necessary to swing the upper end of the lever 20 forwardly to tilt the links upwardly and the seat may then be moved forwardly to the dotted line position shown. The links 12 and 14 will fold with respect to each other and the base 8, and flanged members 10 are slotted interiorly, as at 22, to accommodate said links in folded position.

It will be noted that the forward end portions of the side members 10 adjacent the bearings 15, are formed with outwardly flanged portions 23 which are inclined upwardly and rearwardly. Said flanges, cooperating with the lower flanged edges of the channel side members 10, engage the ends of the shafts 16 to prevent the front part of the seat from moving backwardly when the seat is tipped up, thus maintaining the correct position of the pivot with relation to the channel member 10.

In the normal position of the seat, the parts are as shown in full lines in Fig. 6. The pivotal connections 13 of the links are out of alinement with the pivot points 11 and 16 with the result that a toggle effect results which locks the seat in fixed, normal position. From this position, however, the seat may be tilted forward to Fig. 3 position, pivoting on the shafts 16. If it is desired to move the seat forward, it is only necessary to move the link handles 13' upwardly to raise the inner ends of the links 14, thereby unlocking the same and permitting the links to fold as the seat moves forward on its wheels, the connected together link mechanism on both sides permitting a parallel motion and also locking the seat in its forward position. The rigid connection of the transverse rods 11 and 14' prevents any twisting movement of the seat.

From the foregoing description, it will be seen that the improved vehicle seat is of very simple and novel construction, and is well adapted for the purpose described.

What we claim as our invention is:

1. The combination with the floor portion of a vehicle, of a movable seat, comprising a body portion, supporting rollers depending from both end portions of the body portion, pairs of pivotally connected links on each side of the body portion and connected to move together, one of said links of each pair being pivoted to the rear of said body portion and the other link of each pair being pivotally connected with the vehicle floor, said links being movable to a locking position only when the seat is in normal position, and means for manually operating the said links to move the same out of locking position on each side of the body portion.

2. A longitudinally movable vehicle seat comprising a body portion, link mechanism associated with said body portion, and additional means cooperating with said link mechanism for preventing the seat from being moved in any other than in a horizontal plane excepting from a normal position.

3. A longitudinally movable vehicle seat, comprising a body portion mounted to move horizontally, link mechanism pivotally connected to the body portion adjacent one end and to a support adjacent the other end, and means cooperating with said link mechanism for locking the seat when in a normal position and preventing the seat from being moved horizontally, but permitting one end to be revolved about the other in a vertical plane.

4. A longitudinally movable vehicle seat, comprising a body portion mounted to move horizontally, a link mechanism pivotally connected to the body portion adjacent one end and to a support adjacent the other end and permitting the seat to move horizontally independently of other movements, and means for preventing any vertical movement of the seat except from a normal position.

In testimony whereof, we affix our signatures.

HERMAN L. VAN VALKENBURG.
SWIFT MILLER.